US012050620B2

(12) United States Patent
Sonawane et al.

(10) Patent No.: US 12,050,620 B2
(45) Date of Patent: Jul. 30, 2024

(54) OPTIMIZED SYNCHRONIZATION FOR REDIRECTED STANDBY DML COMMANDS

(71) Applicant: Oracle International Corporation, Redwood Shores, CA (US)

(72) Inventors: Sachin Vijakumar Sonawane, Foster City, CA (US); Mahesh Baburao Girkar, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/524,436

(22) Filed: Nov. 11, 2021

(65) Prior Publication Data
US 2023/0145520 A1     May 11, 2023

(51) Int. Cl.
*G06F 16/27*     (2019.01)
*G06F 16/2455*     (2019.01)

(52) U.S. Cl.
CPC ........ *G06F 16/273* (2019.01); *G06F 16/2455* (2019.01)

(58) Field of Classification Search
CPC ... G06F 16/273; G06F 16/2455; G06F 16/275
See application file for complete search history.

(56) References Cited

U.S. PATENT DOCUMENTS

| 7,769,722 | B1 | 8/2010 | Bergant |
| 8,738,568 | B2 | 5/2014 | Ghosh |
| 10,216,582 | B2 | 2/2019 | Biurbonnais |
| 10,929,393 | B2 | 2/2021 | Das |
| 10,949,413 | B2 * | 3/2021 | Sonawane ........... G06F 11/2035 |
| 2016/0179867 | A1 | 6/2016 | Li |

(Continued)

FOREIGN PATENT DOCUMENTS

| EP | 3 327 587 A1 | 5/2018 |
| WO | WO 2013/041055 A1 | 3/2013 |

OTHER PUBLICATIONS

Sonawane, U.S. Appl. No. 16/016,978, filed Jun. 25, 2018, Notice of Allowance and Fees Due, May 24, 2022.

(Continued)

*Primary Examiner* — Alicia M Willoughby
(74) *Attorney, Agent, or Firm* — Hickman Becker Bingham Ledesma LLP

(57) ABSTRACT

Techniques described herein allow a standby DBMS to maintain consistency of results for transactions that include redirected DML commands without requiring the standby DBMS to delay execution of queries that do not require changed objects. Specifically, a standby session records DML target object (DTO) record with information regarding DML-changed objects and transaction information from the primary DBMS. Using DTO records, the standby DBMS ensures that results of any additional queries include changes made by the redirected DML commands without delaying execution of queries that do not access changed objects. If a target object in a standby query is in a DTO record, then query execution is delayed until the standby database is updated to the timestamp indicated in the DTO record. Thus, the delayed query has access to changes made by the DML command. Otherwise, the query is immediately executed without waiting for the standby database synchronization.

20 Claims, 8 Drawing Sheets

(56) References Cited

U.S. PATENT DOCUMENTS

| | | | |
|---|---|---|---|
| 2016/0216905 A1* | 7/2016 | Yazdani | G06F 3/0619 |
| 2016/0217042 A1 | 7/2016 | Wang | |
| 2017/0116278 A1 | 4/2017 | Baby | |
| 2018/0046693 A1 | 2/2018 | Brodt | |
| 2018/0165324 A1* | 6/2018 | Krishnaswamy | G06F 11/1471 |
| 2018/0246945 A1* | 8/2018 | Lee | G06F 11/3476 |
| 2018/0349458 A1* | 12/2018 | Guirguis | G06F 16/273 |
| 2019/0102421 A1* | 4/2019 | Sonawane | G06F 11/2048 |
| 2019/0392067 A1* | 12/2019 | Sonawane | G06F 16/2435 |

OTHER PUBLICATIONS

Sybase, Inc., "Using Sybase Failover in a High Availability System", https://infocenter.sybase.com/help/topic/com.sybase.dc31651_1251/pdf/ha_avail.pdf, Sep. 2003, 396pgs.

SAP, "How to Perform System Replication for SAP HANA", https://www.sap.com/docs/download/2013/10/26c02b58-5a7c-0010-82c7-eda71af511fa.pdf, SAP How-to-Guide, Business Analytics, Version 4.5, Dec. 2017, pp. 1-59.

Preston, W. Curtis, "Snapshot 101: CoSnapshot 101: Copy-on-write vs Redirect-on-writepy-on-write vs Redirect-on-write", https://storageswiss.com/2016/04/01/snapshot-101-copy-on-write-vs-redirect-on-write/, Apr. 1, 2016. Storage Switzerland, LLC, pp. 1-6.

Oracle Corp., "Technical Comparison of Oracle Database 12c vs. Microsoft SQL Server 2012: Focus on High Availability", Nov. 2013, Oracle White Paper, 68pgs.

Oracle Corp., "Oracle Active Data Guard: What's Really Under the Hood", https://web.archive.org/web/20121224132556/https://www.oracle.com/technetwork/database/features/availability/s316924-1-175932.pdf, (capture date from Archive.org), Dec. 24, 2012, 41pgs.

Oracle Corp, "Oracle Active Data Guard Real-Time Data Protection and Availability", Oracle White Paper, Oct. 1-21, 2016.

Knutsen, Lester, "Informix Best Practices Backup, Recovery, and High Availability Disaster Recovery (HDR)", https://advancedatatools.com/Downloads/InformixBestPractices-Backups+HDR.pdf, Apr. 20, 2017, Advanced DataTools, pp. 1-62.

IBM Redbooks, "High Availability and Disaster Recovery Options for DB2 for Linux, UNIX, and Windows", https://www.redbooks.ibm.com/redbooks/pdfs/sg247363.pdf, Oct. 18, 2012, IBM, pp. 1-584.

IBM Redbooks, "Content Manager OnDemand Backup, Recovery, and High Availability", ibm.com/redbooks, Oct. 2005, IBM, pp. 1-384.

Oracle, Oracle Active Data Guard Oracle Data Guard 11g, "Maximum Availability Architecture", Oracle Maximum Availability Architecture White Paper, dated Sep. 2011, 41 pages.

Oracle Technology Network, "Active Data Guard Demonstrations", http://www.oracle.com/technetwork/database/availability/demo-2, dated Aug. 8, 2018, 2 pages.

Oracle Database 12c "Oracle Database 12c—Global Data Services", Load Balancing and Service Failover for Replicated Databases, An Oracle White Paper dated Jun. 2013, 14 pages.

Sonawane, U.S. Appl. No. 16/016,978, filed Jun. 25, 2018, Final Rejection, Nov. 19, 2021.

Sonawane, U.S. Appl. No. 16/016,978, filed Jun. 25, 2018, Office Action, May 21, 2021.

Sonawane, U.S. Appl. No. 16/016,978, filed Jun. 25, 2018, Office Action, Mar. 5, 2020.

Sonawane, U.S. Appl. No. 16/016,978, filed Jun. 25, 2018, Final Office Action, Aug. 26, 2020.

Sonawane, U.S. Appl. No. 16/016,978, filed Jun. 25, 2018, Advisory Action, Nov. 6, 2020.

Sonawane, U.S. Appl. No. 16/016,978, filed Jun. 25, 2018, Notice of Allowance and Fees Due, Aug. 2, 2022.

* cited by examiner

202 A STANDBY DATABASE SYSTEM MAINTAINING A STANDBY DATABASE THAT REPLICATES A PRIMARY DATABASE MAINTAINED BY A PRIMARY DATABASE SYSTEM

204 THE STANDBY DATABASE SYSTEM REDIRECTING, TO THE PRIMARY DATABASE SYSTEM, A DML COMMAND FROM A PARTICULAR STANDBY SESSION OF THE STANDBY DATABASE SYSTEM, WHERE THE DML COMMAND, WHEN EXECUTED, CAUSES MODIFICATION OF ONE OR MORE DATABASE OBJECTS

206 RECEIVE, FROM A PRIMARY DATABASE SYSTEM, TRANSACTION METADATA FOR A SHADOW TRANSACTION THAT IMPLEMENTED THE DML COMMAND WITHIN THE PRIMARY DATABASE, THE TRANSACTION METADATA COMPRISING ONE OR MORE TIMESTAMPS FOR THE SHADOW TRANSACTION

208 FOR EACH DATABASE OBJECT OF THE ONE OR MORE DATABASE OBJECTS, RECORD, IN SESSION DATA FOR THE PARTICULAR STANDBY SESSION, A DML TARGET OBJECT RECORD (DTOR) COMPRISING A TIMESTAMP, OF THE ONE OR MORE TIMESTAMPS, AND AN IDENTIFIER OF SAID EACH DATABASE OBJECT

210 EXECUTE A QUERY IN THE PARTICULAR STANDBY SESSION THAT ACCESSES A PARTICULAR DATABASE OBJECT

212 DETERMINE WHETHER ANY VALID DTOR IN THE SESSION DATA INCLUDES AN IDENTIFIER OF THE PARTICULAR DATABASE OBJECT

214 DELAY EXECUTION OF THE QUERY

| Object ID | Transaction ID | Undo SCN | Sync Flag |
|---|---|---|---|
| Employee _402_ | 320 | 100 | TRUE |
| Locations _404_ | 320 | 105 | TRUE |

400 ↗

| Object ID | Transaction ID | Undo SCN | Sync Flag |
|---|---|---|---|
| Employee _402_ | 320 | 150 | TRUE |
| Locations _404_ | 320 | 105 | TRUE |
| Time _406_ | 320 | 150 | TRUE |

| Object ID | Transaction ID | Undo SCN | Sync Flag |
|---|---|---|---|
| Employee | 320 | 150 | FALSE |
| Locations | 320 | 105 | FALSE |
| Time | 320 | 175 | TRUE |

402
404
406

420

OPTIMIZED SYNCHRONIZATION FOR REDIRECTED STANDBY DML COMMANDS

CROSS-REFERENCE TO RELATED APPLICATIONS

This application is related to U.S. application Ser. No. 15/885,281, titled "Method And System For Supporting Data Consistency On An Active Standby Database After DML Redirection To A Primary Database", filed Jan. 31, 2018 (referred to herein as the "DML Redirection Application"), and to U.S. application Ser. No. 16/016,978, titled "Automatic Query Offloading to a Standby Database", filed Jun. 25, 2018, the entire contents of each of which is incorporated by reference as if fully set forth herein.

FIELD OF THE INVENTION

The present invention relates to automatically causing Data Manipulation Language (DML) commands, initiated as part of transactions on a standby database comprising a physical replica of a primary database, to be executed at the primary database without losing the correctness of results for the transactions at the standby database.

BACKGROUND

In case of data corruption or system failure at a primary database, one or more physical or logical copies of the primary database may be maintained as separate databases known as standby databases. Thus, if the primary database fails, a failover to the standby database may be performed. Typically, the primary database and the standby database are maintained in separate database systems that are remotely connected.

A user may choose to initiate a query either on a primary database system or on a standby database system. Generally, queries issued to a primary database system are fulfilled by the primary database system, and queries issued to a standby database system are fulfilled by the standby database system. However, standby databases are, by and large, read-only databases, which prevents execution of Data Manipulation Language (DML) commands on the standby database. As such, a DML command issued to a standby database system may cause the system to throw an error, which prevents the DML command from changing the copy of data maintained in the standby database. However, rejection of DML commands at the standby database system reduces utility of the system.

Furthermore, as described in the DML Redirection Application incorporated by reference above, a DML command initiated on a standby database system may be redirected to the primary database system instead of causing the standby system to throw an error. For example, the standby database system maintains a database link to the primary database system, and automatically directs the DML command to the primary system using the database link. The primary database system executes the redirected DML command.

Once the change directed by the DML command is made in the primary database, the change is propagated to the standby database based on change records being sent to the standby database system from the primary database system. The standby database typically lags behind the primary database because it takes time for the change records to be sent to the standby system, and then for the changes reflected in the change records to be applied to the standby database. Thus, the standby database's state is continuously catching up to the primary database's state. Primary and standby databases transition through states as changes are made. Each state is associated with a system change number ("SCN").

The ACID property of consistency requires that, when a standby transaction includes a query that requires a database object that is changed by a prior redirected DML command, results for the query should be based on a state of the database object that includes the changes made by the DML command. As such, to maintain consistency of query results on the standby database system, the standby system generally delays execution of a standby transaction, which includes a redirected DML command, until the standby database's latest-synchronized SCN reaches or exceeds an SCN associated with a primary transaction, implemented at the primary system, that executed the redirected DML command. Because of the delay in replicating changes made to the primary database in the standby database, completion of a standby transaction with a redirected DML command can take a significant amount of time.

Accordingly, it would be beneficial to minimize the delay caused by redirecting DML commands to a primary database system from a standby database system.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 2 depicts a flowchart for using DML target object records to selectively delay standby transaction execution when the transaction includes one or more queries that require database objects that have been modified by a redirected DML command.

FIGS. 4A-4B depict sets of example DML target object records maintained by an example standby session.

DETAILED DESCRIPTION

In the following description, for the purposes of explanation, numerous specific details are set forth in order to provide a thorough understanding of techniques described herein. It will be apparent, however, that the described techniques may be practiced without these specific details. In other instances, well-known structures and devices are shown in block diagram form in order to avoid unnecessarily obscuring the described techniques.

1. General Overview

Not all queries within a standby transaction that includes a DML command require a database object that is changed by the DML command. The queries that do not require database objects changed by a DML command may be executed without waiting for changes performed by a primary database system, based on redirection of the DML command, to be propagated to the standby database. Accordingly, techniques are described herein for a standby database system recording, in memory, DML target object (DTO) records that contain information identifying database objects changed by redirected DML commands. The DTO records also include transaction information (such as transaction timestamp(s)) received from the primary database system for one or more primary transactions implementing the redirected DML commands. The standby database system uses the DTO records to return consistent results for queries that are part of a transaction containing a redirected DML command without requiring the standby system to delay transaction execution for queries that do not require database objects changed by the redirected DML commands.

Specifically, after redirecting a DML command to a primary database system and recording one or more DTO records for one or more database objects changed by the DML command, the standby database system determines whether a particular database object required by a subsequent query is identified in a DTO record. If not, the query may be immediately executed without waiting for the standby database to be updated with changes made in the primary database. However, if the particular database object is identified in a DTO record, execution of the query is delayed until the standby database has been updated to a transaction timestamp indicated in the DTO record. This delay ensures that the query has access to changes made by the executed DML command.

The ability to execute standby transactions, that include DML commands and queries that do not require database objects changed by the DML commands, without delay improves the execution time of many transactions, while ensuring the consistency of results of such transactions. Many times, the majority of standby transactions that require DML redirection in a workload are able to be executed without delay using techniques described herein, which can greatly reduce the time and resources required to execute queries for the workload.

2. DML Command Redirection

Figure 1:
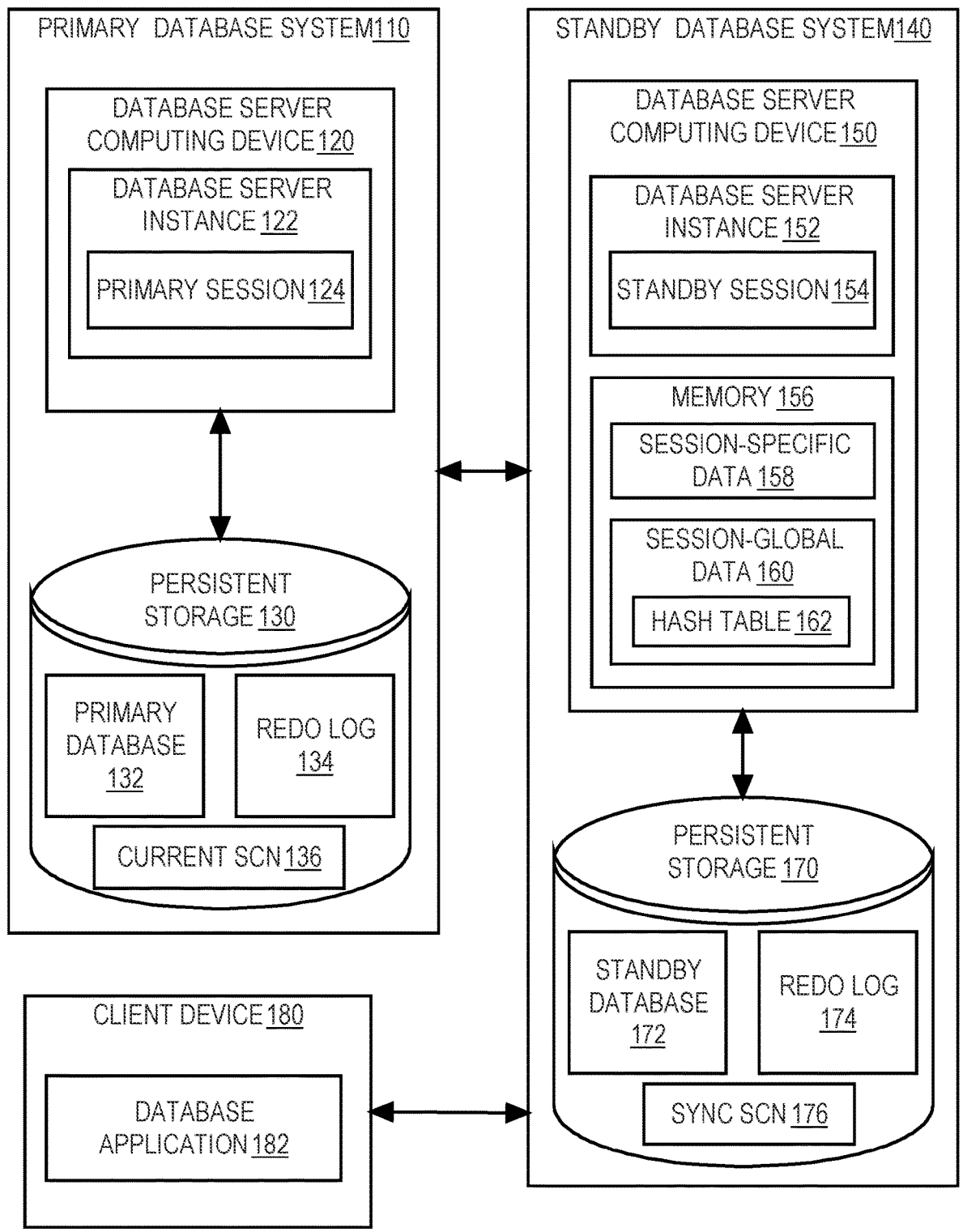
FIG. 1 depicts an example database system configuration comprising a primary database system and a standby database system, on which embodiments may be implemented.

Generally, an asynchronously-updated standby database physically replicates a primary database on a block-by-block basis, and as such, has read-only functionality. FIG. 1 depicts an example database system configuration 100 comprising a primary database system 110, which maintains a primary database 132, that is communicatively coupled to a standby database system 140, which maintains a standby database 172 that is a physical replica of primary database 132. As a synchronized physical replica, standby database 172 replicates the contents of primary database 132 on a block-by-block basis. Because standby database 172 is read-only, standby database system 140 redirects any commands that require data changes, i.e., DML commands, to primary database system 110 for execution.

FIG. 2 depicts a flowchart 200 for using DML target object records to selectively delay standby transaction execution when the transaction includes one or more queries that require database objects that have been modified by a redirected DML command. At step 202, a standby database system maintains a standby database that replicates a primary database maintained by a primary database system. For purposes of illustration herein, primary database system 110 and standby database system 140 of FIG. 1 are described as non-limiting example systems implementing techniques described herein. However, the primary and standby database systems may be implemented in any way.

At step 204 of flowchart 200, the standby database system redirects, to the primary database system, a DML command from a particular standby session of the standby database system, where the DML command, when executed, causes modification of one or more database objects. For example, a database application 182 running on a client device 180, which is communicatively coupled to standby database system 140 in any way, including via a network, establishes a standby database session 154 to execute database commands from application 182. Database application 182 uses standby session 154 to issue an example standby transaction, such as standby transaction 300 depicted by FIG. 3. Standby transaction 300 includes the following example DML command 302, which standby database system 140 redirects to primary database system 110:

INSERT INTO Employee (Name, Position)
VALUES ("Sunita Rayes", "Software Engineer")

Specifically, instance 152 automatically causes DML command 302 to be remotely executed on (or "redirected to") primary database system 110. According to various embodiments, standby database system 140 establishes an in-memory database link to primary database system 110. Creating such a database link automatically establishes a new session 124, on primary database system 110 using the same database credentials as standby session 154, in which all database commands issued over the database link will execute. Session 124 executes a transaction 320 including DML command 302 on primary database system 110, referred to herein as a "shadow" transaction, to insert the indicated values into the Name and Position columns of the Employee table maintained in primary database 132.

According to various embodiments, instance 152 determines that an example DML command 304 immediately follows DML command 302 in standby transaction 300 and automatically redirects DML command 304 with DML command 302 to be executed in the same shadow transaction 320. In this example, DML command 304 makes a change to a "Locations" table.

At step 206 of flowchart 200, transaction metadata for a shadow transaction that implemented the DML command within the primary database is received from the primary database system, the transaction metadata comprising one or more timestamps for the shadow transaction. According to various embodiments, this transaction metadata includes information identifying a primary shadow transaction implementing the redirected DML command and/or information from one or more undo records that record one or more changes implemented by the redirected DML command.

To illustrate, after redirecting DML commands 302 and 304 to primary database system 110, standby database system 140 receives transaction metadata from primary database system 110, e.g., via the database link. The transaction metadata includes information for shadow transaction 320, including the transaction identifier "320", and one or more timestamps associated with shadow transaction 320. For example, the received transaction metadata includes an undo SCN of '100' for an undo record that records the change caused by execution of DML command 302 and an undo SCN of '105' for an undo record that records the change caused by execution of DML command 304. The transaction metadata may include additional information, such as undo block addresses (UBAs) that identify locations of these changes within primary database 132.

3. Session-Level DML Target Object Records

When a standby transaction includes queries over database data after DML commands change the data (as in example transaction 300), results of these further queries should include the changes made to the data by the redirected DML commands, as appropriate. However, not all queries within a standby transaction that includes one or more DML commands will require data from changed database objects. Thus, as described in further detail below, a standby database system records, in memory, DML target object (DTO) records that contain information identifying database objects changed by redirected DML commands. The standby database system uses the DTO records to return consistent results for queries that are part of a transaction containing a redirected DML command without requiring the standby system to delay transaction execution for queries that do not require database objects changed by the redirected DML commands.

Returning to the discussion of flowchart 200, at step 208, for each database object referred to by the DML command, a DTO record (comprising a timestamp, of the one or more timestamps, and an identifier of said each database object) is recorded in session data for the particular standby session. For example, standby database system 140 stores, in memory 156 of database server computing device 150, a set of DTO records that comprises information from the transaction metadata for shadow transaction 320 received from primary database system 110.

According to various embodiments, DTO records for DML commands originating in standby session 154 are stored by a database session process for standby session 154, in memory 156, as session-specific data 158 that is private to standby session 154, e.g., by virtue of being stored in a private memory area in memory 156 that is allocated for standby session 154 and accessible only by database session processes for session 154.

Figure 4B:

FIGS. 4A-4B depict various non-limiting example sets of DTO records that may be maintained by standby database system 140. The DTO records in FIGS. 4A-4B include the following example information: an object identifier that uniquely identifies a database object changed by a redirected DML command; a transaction identifier that identifies a transaction on the primary database system that implemented the redirected DML command; a timestamp associated with an undo record that records the change resulting from execution of the redirected DML command; and a sync flag.

The sync flag is an example mechanism for tracking whether a particular DTO record is valid or invalid. A valid DTO record is associated with a timestamp that is beyond (e.g., greater than) a current synchronization timestamp for standby database 172 (e.g., Sync SCN 176); conversely, an invalid DTO record is associated with a timestamp that is not beyond (e.g., equal to or less than) Sync SCN 176. Any mechanism for determining whether a DTO record is valid or invalid may be employed according to various embodiments. In various embodiments that employ a sync flag as described herein, a "valid" DTO record is associated with a TRUE sync flag, and an "invalid" DTO record is associated with a FALSE sync flag.

Once Sync SCN 176 has reached the undo SCN of a given DTO record, the record may be marked as invalid in any way. For example, a background process may adjust the sync flags of DTO records, as needed, when Sync SCN 176 changes. As another example, upon determining that a database object that is the target of a query is included in a valid DTO record, instance 152 checks whether Sync SCN 176 has reached the undo SCN of the identified DTO record. If so, instance 152 automatically marks the DTO record as invalid.

Example set 400 includes DTO records 402 and 404 recording information for the database objects adjusted by DML command 302 and DML command 304, respectively, being executed in shadow transaction 320. Specifically, DTO record 402 indicates that the Employee table is changed in primary transaction "320" with an undo SCN of '100'. Similarly, DTO record 404 indicates that the Locations table is also changed in primary transaction "320" with an undo SCN of '105'. DTO records 402 and 404 are both indicated as valid based on TRUE sync flags.

The records in a DTO set may be stored in memory 156 as objects in a linked list, or in an array, and are added to any other DTO records already stored as session-specific data 158 in memory 156 for standby session 154. If a DTO record for a database object being modified by a DML command is already present in session-specific data 158, then the undo SCN in the existing record is updated to the SCN indicated in the most recent transaction metadata. If needed, the updated record is marked as valid.

4. Execution of Further Queries in the Standby Transaction

Using DTO records maintained for a standby session, a standby database system ensures that results of additional queries in a standby transaction are executed based on any changes made by DML commands in the transaction, as needed, without delaying execution of queries that do not require changed database objects. For example, instance 152 uses example DTO records in FIGS. 4A-4B, stored in session-specific data 158 by a database session process for standby session 154, to evaluate further queries in standby transaction 300 to determine whether the queries can be executed without delay.

4.1. Non-Delayed Query Execution

Returning to the discussion of flowchart 200, at step 210, after recording the one or more DTO records, executing a query in the particular standby session that accesses a particular database object. As depicted in FIG. 2, step 210 comprises steps 212-214 of flowchart 200. Specifically, at step 212, it is determined whether any valid DTO record in the session data includes an identifier of the particular database object, i.e., accessed by the query of step 210. If the particular database object is not included in a valid DTO record for the session, then execution of the query may proceed without waiting for the standby database to be updated with changes made in the primary database by redirected DML commands.

For example, standby transaction 300 includes a query 306 after DML commands 302 and 304, which requires data in a Time table within standby database 172. Instance 152 determines whether DTO record set 400, in session-specific data 158, includes a valid DTO record identifying a target object of query 306 (e.g., the Time table). In this example, no DML command in transaction 300 has modified the Time table, and as such, an identifier of the Time table is not included in DTO records set 400. Based, at least in part, on the determination that no database object that is required for execution of query 306 is included in a valid DTO record in session-specific data 158, instance 152 executes query 306 without waiting for standby database 172 to be updated with changes made in primary database 132 by redirected DML commands.

The ability to execute the queries without delay takes advantage of the fact that, many times, queries in transactions on a standby database system that include DML commands do not access the database objects that are targeted by the DML commands. Thus, use of DTO records to avoid delayed execution of standby transactions improves the execution time of many standby transactions.

After query 306, standby transaction 300 includes a further example DML command 308, which updates the Employee table and the Time table. A database session process for standby session 154 automatically redirects DML command 308 to primary database system 110, as described above. Once DML command 308 is received at primary database system 110, DML command 308 is executed using shadow transaction 320, depicted in FIG. 3, within primary session 124.

After DML command 308 is executed by primary session 124, instance 152 receives transaction metadata for shadow transaction 320 from primary database system 110. A database session process for standby session 154 updates DTO records set 400 in session-specific data 158 to reflect the transaction information. Specifically, as indicated by updated DTO records set 410, instance 152 adds a new DTO record 406 to session-specific data 158 to indicate that the Time table has been updated by shadow transaction 320 having an undo SCN of '150'. Furthermore, DTO record 402 is updated to indicate that the latest changes to the Employee table were made by shadow transaction 320 with an undo SCN of '150'. In this example, Sync SCN 176 has not yet reached '105', and as such, DTO record 404 is still valid, with the sync flag set to TRUE.

4.2. Delayed Query Execution

If the particular database object that is the target of a query that follows a redirected DML command in a standby transaction is included in a valid DTO record, then execution of the query is delayed until standby database 172 has been updated such that Sync SCN 176 has reached the timestamp indicated in the DTO record. Returning to the discussion of flowchart 200, step 214 is performed responsive to determining that a particular valid DTO record in the session data includes the identifier of the particular database object at step 212. At step 214, execution of the query is delayed, e.g., until a synchronization timestamp of the standby database has reached a particular timestamp indicated in the particular valid DTO record. As described in further detail below, the delay may also be based on one or more global DTO records.

To illustrate, after redirecting DML command 308 to primary database 132, instance 152 executes query 310, which selects data from the Employee table. In connection with execution of query 310, instance 152 determines whether an identifier of the Employee table, required for execution of query 310, is included in any valid DTO records in session-specific data 158. Instance 152 locates an identifier of the Employee table in valid DTO record 402.

Because query 310 accesses a database object (Employee table) that is identified in a valid DTO record 402, instance 152 automatically delays execution of query 310 until standby database 172 syncs to the SCN of '150' indicated in DTO record 402. In this example, at the time of determining to delay execution of query 310, Sync SCN 176 is '99'. Instance 152 monitors Sync SCN 176 to identify the time at which Sync SCN 176 reaches the undo SCN recorded for the Employee table (i.e., '150'). This delay ensures that the results of query 310 will satisfy the ACID property of consistency.

5. Accessing Uncommitted Changes Propagated from the Primary Database

Once Sync SCN 176 reaches the target undo SCN, standby database 172 reflects the one or more uncommitted changes resulting from execution of the DML commands redirected to primary database system 110. To illustrate, one or more change records (such as change records 506A-N of FIG. 5, described in further detail below) that describe changes caused by primary database system 110 executing the redirected DML commands are generated and stored in redo log 134 at primary database system 110. These records are sent to standby database system 140 (i.e., before the associated transaction on the primary system has committed), where the change records are stored in redo log 174. Based on these change records, the one or more uncommitted changes are applied to the contents of standby database 172.

Once instance 152 determines that Sync SCN 176 has reached the target SCN, e.g., the undo SCN recorded in DTO record set 410 for the Employee table, control is returned to standby session 154 to resume execution of transaction 300. As indicated above, the transaction metadata received from primary database system 110 includes information identifying one or more shadow transactions implementing any redirected DML commands. Instance 152 associates the information identifying the one or more shadow transactions with standby session 154, which enables database session processes for standby session 154 to access uncommitted changes within standby database 172 that were performed by the one or more shadow transactions.

6. Global DML Target Object Records

According to various embodiments, DTO records in session-specific data 158 are copied to session-global data 160 to make them available to other sessions of instance 152. Accordingly, session-global data 160 may be accessed by multiple sessions, including at least one other session other than standby session 154 that originated the DTO records. For example, session-global data 160 is a portion of memory 156 that is configured to be accessible by all sessions of database server instance 152. According to various embodiments, a database session process for standby session 154 copies session-specific DTO records to session-global data 160 once the transaction that caused the DTO records to be created commits, and the copied DTO records are deleted from session-specific data 158.

The DTO records in session-global data 160 are used to determine whether execution of queries by any session of instance 152 should be delayed based on redirected DML commands. For example, the sessions of instance 152 operate based on statement-level read consistency. According to statement-level read consistency, any transaction being executed by the sessions of instance 152 should have access to the changes caused by transaction 300 once transaction 300 has committed and any applicable DTO records are moved to session-global data 160.

As a further example, the sessions of instance 152 operate based on transaction-level read consistency. Session 154 assigns an SCN the commit event for standby transaction 300 based on a latest SCN associated with DTO records generated for the transaction. In the example of FIG. 4B, the latest SCN associated with a DTO record for transaction 300 (implemented via shadow transaction 320) is 175, and as such, standby session 154 assigns the commit event of transaction 300 the SCN of 175. Any transaction being executed by any session of instance 152 with an initiation SCN of greater than 175 should have access to the changes caused by transaction 300.

To further illustrate, continuing with example query 306 above, the determination to immediately execute query 306 is based on determining whether a target database object of the query is included in any valid DTO record maintained in session-specific data 158 or in session-global data 160. Instance 152 executes query 306 without delay in response to determining that no target database object of the query is identified in a valid DTO record in session-specific data 158 or in session-global data 160.

To further illustrate, standby transaction 300 commits at a time when Sync SCN 176 is '155' and DTO record set 420 of FIG. 4B is maintained in session-specific data 158. As shown in DTO record set 420, DTO records 402 and 404 are invalidated given that Sync SCN 176 has reached the undo SCNs of these records. Further, DTO record 406 has been updated to reflect a change to the Time table performed by execution of DML command 312 by shadow transaction 320 on primary database system 110, which is associated with an undo SCN of '175'. Because Sync SCN 176 has not yet reached '175', DTO record 406 is marked as valid.

When standby transaction 300 commits, instance 152 copies DTO record set 420 to session-global data 160. According to various embodiments, only valid DTO records are copied to session-global data 160. To illustrate, when standby transaction 300 commits, instance 152 copies DTO record 406 to session-global data 160. However, all of DTO record set 420 may be copied to session-global data 160.

According to various embodiments, DTO records are stored in a hash table 162 in session-global data 160, where the object identifiers of the records are used as hash keys. Storing DTO records in a hash table allows instance 152 to perform fast queries over the global DTO records to identify whether queries require database objects that are identified in valid global DTO records.

For example, in order to copy a DTO record into hash table 162, one or more hash functions (of any type) are applied to the object identifier in the record to identify a hash bucket in hash table 162 in which to store the record. Example hash table 162 includes 20 buckets, and the hash function used to insert items into the hash table converts the object identifier to an integer (e.g., "Time"=112) and MODs the integer by the number of buckets. Thus, to add DTO record 406 to hash table 162, instance 152 uses the hash function to determine that the bucket number for DTO record 406 is '12', i.e., 112 MOD 20=12. Accordingly, instance 152 inserts DTO record 406 into hash_table_162 [12]. If one or more DTO records are already in the bucket, DTO record 406 may be added at the end of a linked list of the DTO record objects already in that bucket of the hash table. If a DTO record identifying the Time table already exists in hash table 162, then a database session process for standby session 154 updates the existing record to reflect the information from DTO record 406.

According to various embodiments, before each record is added to hash table 162, instance 152 determines whether Sync SCN 176 has reached the undo SCN of the record. If so, then the DTO record does not need to be copied into session-global data 160. If not, then the DTO record is copied into hash table 162.

Furthermore, to facilitate use of the set of global DTO records in session-global data 160, metadata indicating a maximum SCN associated with the stored global DTO records is maintained. The maximum SCN metadata may be used to determine whether the hash table includes any DTO records with SCNs after a current Sync SCN 176 prior to probing the hash table. When Sync SCN 176 is less than the recorded maximum SCN, database session processes probe hash table 162 to determine whether any target object of any queries being executed within the sessions is identified in a valid DTO record.

For example, a database session process executing a query over standby database 172 first determines whether global hash table 162 is non-empty. If so, the database session process determines whether the target database object being queried is identified in a DTO record in hash table 162 and, if so, whether Sync SCN 176 has reached the undo SCN in the identified DTO record. If a DTO record is identified and Sync SCN 176 has not yet reached the included undo SCN, the database session process delays query execution until Sync SCN 176 has reached the undo SCN in the identified DTO record. Once Sync SCN 176 has reached the undo SCN in the identified DTO record, the database session process deletes the identified DTO record from global hash table 162 or invalidates the identified DTO record.

According to various embodiments, when Sync SCN 176 is advanced, instance 152 determines whether Sync SCN 176 is at or beyond the maximum SCN maintained for hash table 162. If so, instance 152 clears all of the entries from hash table 162, e.g., by marking a global validity flag as FALSE. In this case, if the global validity flag is FALSE, then database session processes need not probe hash table 162 to proceed with query execution.

7. Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

Generally, data is stored in a database in one or more data containers (referred to herein as "database objects"), each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A single-node database system, such as system 110 or system 140, comprises a single node that runs a database server instance that accesses and manages the database. A multi-node database management system is made up of interconnected nodes that share access to the same database. Typically, the nodes are interconnected via a network and share access, in varying degrees, to shared storage, e.g., shared access to a set of disk drives and data blocks stored thereon. The nodes in a multi-node database system may be in the form of a group of computers (e.g., workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal agent-processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables, and other information.

A database server includes multiple database processes. Database processes run under the control of the database server (i.e., can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

7.1. Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

7.2. Maintaining Consistency Between a Primary Database and a Standby Database

A primary database system and a standby database system may each correspond to any of a number of different types of database systems, such as a clustered database system, a single-server database system (as depicted in FIG. 1) and/or a multi-tenant database system. In the example of FIG. 1, primary database system 110 includes a database server computing device 120 and persistent storage 130. Database server computing device 120 runs a database server instance ("instance") 122, which is a collection of memory and processes that interact with primary database 132. Instance 122 implements the server-side functions of primary database system 110. Similarly, standby database system 140 includes a database server computing device 150 and persistent storage 170. Database server computing device 150 runs database server instance ("instance") 152, which is a collection of memory and processes that interact with standby database 172. Instance 152 implements the server-side functions of standby database system 140. Computing device 150 further comprises volatile memory 156 (e.g., DRAM), which includes session-specific data 158 and session-global data 160 utilized by processes for multiple sessions established at standby database system 140.

Primary database 132 and standby database 172 may each be maintained in any way, such as residing in persistent storage as depicted in FIG. 1 and/or residing in volatile storage, on a virtual disk and/or a set of physical disks, etc.

Maintaining consistency between a primary database and a standby database involves replicating changes made to the primary database in the standby database. A standby database that maintains a physical replica of the primary database replicates the primary database on a block-by-block level. Thus, the SCNs in a physical standby database represent the same database state as corresponding SCNs of the primary database being replicated.

Figure 5:
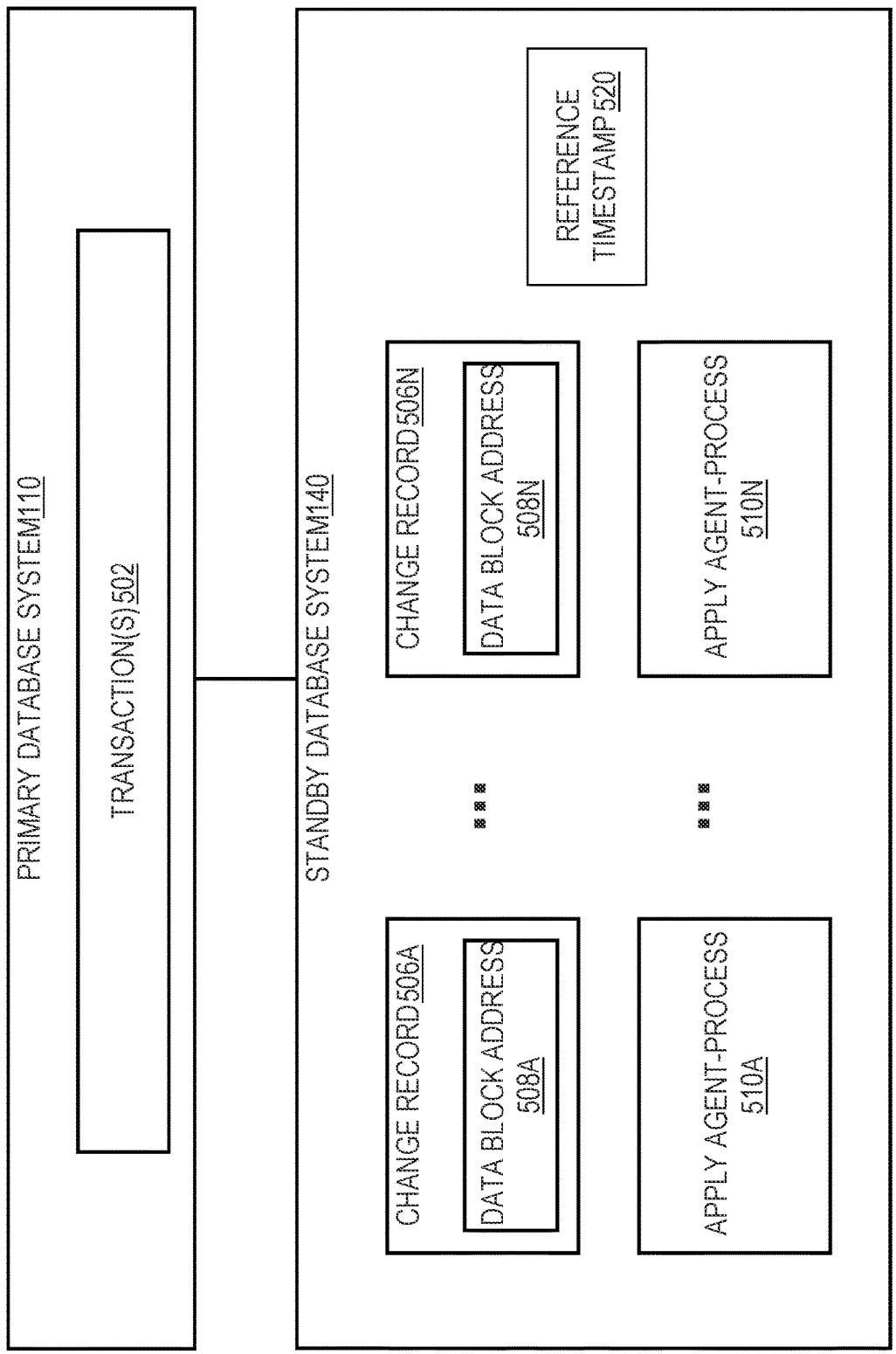
FIG. 5 is a block diagram that depicts an approach for maintaining consistency between multiple databases.

FIG. 5 is a block diagram that depicts an approach for maintaining consistency between a primary database and a standby database where the standby database is a physical replica of the primary database. In FIG. 5, transaction(s) 502 implement one or more changes to primary database 132. Primary database system 110 records the one or more changes in change records 506A-N, and sends these change records to standby database system 140 for replication. The label "N" in "506N," and in any other reference numeral herein, connotes that any number of elements, items, or sets of items may be present or used in embodiments, as in "1 to n items". Example change records 506A-N include redo records and/or undo records as described in U.S. patent application Ser. No. 11/818,975, filed Jan. 29, 2007; U.S. patent application Ser. No. 12/871,805, filed Aug. 30, 2010; U.S. patent application Ser. No. 13/161,315, filed Jun. 15, 2011; and U.S. patent application Ser. No. 14/337,179, filed Jul. 21, 2014, the entire contents of each of which are incorporated herein by reference.

Each of transaction(s) 502 implement one or more changes to primary database 132 based on a set of instructions that are processed as a single logical operation. Multiple data manipulation language (DML) operations (such as Structured Query Language (SQL) commands "INSERT", "UPDATE", and "DELETE") and also queries over database data may be processed as a single transaction. Any changes implemented within database data by a particular transaction are viewable only by the transaction itself prior to committing the transaction, and then are persisted (and made generally visible) when the transaction commits. Transaction(s) 502 that fail to commit may undergo a "rollback" operation that restores a previous state of data.

When a change is implemented at primary database 132, a current system timestamp, also referred to as an SCN, of the primary database increases. An SCN of a primary database represents a logical time that corresponds to a particular state of the primary database. For example, when a particular transaction begins, the current SCN of the primary database is at "1". When the particular transaction makes a particular change, the current SCN of the primary database advances to "2". When the particular transaction commits, the current SCN of the primary database advances to "3".

As mentioned above, change records 506A-N specify one or more changes made by transaction(s) 502 performed against primary database 132. Change records 506A-N generally comprise undo information (i.e., "undo records"), based on which uncommitted changes made to data stored in primary database 132 may be undone. Each undo record may describe how a change to a data block may be undone and a location for the target information (i.e., an undo block address (UBA)). Undo records may be used to provide read consistency when the same data is being accessed at the same time by different users/database sessions. For example, a first user makes changes to data in a table stored in a primary database while a second user reads data from the same table at the same time. In this example, to maintain a read-consistent image of the data for the second user that excludes uncommitted changes to the table, undo records created for changes made by the first user are applied to the table data such that the table data appears to the second user to be the state of the data that existed prior to the uncommitted changes being made.

Primary database system 110 streams change records 506A-N to one or more standby database systems that physically replicate primary database 132, including standby database system 140. In some example embodiments, change records 506A-N may include data block addresses 508A-N. A data block is an atomic unit of data that a database server may request to read from and write to with regard to a storage device that stores table data, e.g., in a block-mode disk storage device. To illustrate, in order to retrieve a row from a storage device, a data block containing the row is read into a cache (such as a cache residing in volatile memory of computing device 120 or computing device 150 of FIG. 1) and the cached copy of the data block stored is examined to access the row.

A data block is used by a DBMS to store one or more database rows, or portions of rows, including one or more columns of a row. When rows are read from persistent storage, a data block containing the row is copied into a data block buffer in RAM and/or main memory of a database server. A data block may correspond to a predetermined number of bytes of physical storage space, and is referred to as atomic because it is generally the smallest unit of database data that a database server may request from a persistent storage device. For example, a DBMS may store data in data blocks that each correspond to two kilobytes of disk space. When a database server seeks a row that is stored in a data block, the data block may only read the row from a persistent storage device by reading in the entire data block.

Each change record includes a data block address that may indicate a location of a particular data block in primary database system 110 and/or standby database system 140. The location may be a relative location of the particular data block at which a change occurred in the primary database. Since the standby database is a replica of the primary database, the location may also be a relative location of the particular data block at which a change is to occur in the standby database.

In some example embodiments, standby database system 140 includes apply agent-processes 510A-N that apply changes indicated in change records 506A-N to corresponding data blocks in the standby database. As standby database system 140 applies received changes to standby database 172, Sync SCN 176 is updated to represent the latest primary SCN at which the data of standby database 172 is consistent with the data of primary database 132. Thus, if Sync SCN 176 is '3', then a query over standby database 172 with a query SCN of '3' will return the same results as a query over primary database 132 with a query SCN of '3'.

8. Alternatives or Extensions

One or more of the functions attributed to any process described herein, according to one or more embodiments, may be performed any other logical or physical entity, according to one or more embodiments. In various embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

9. Hardware Overview

An application or database server instance, such as instance 122, instance 152, or database application 182, runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Figure 3:
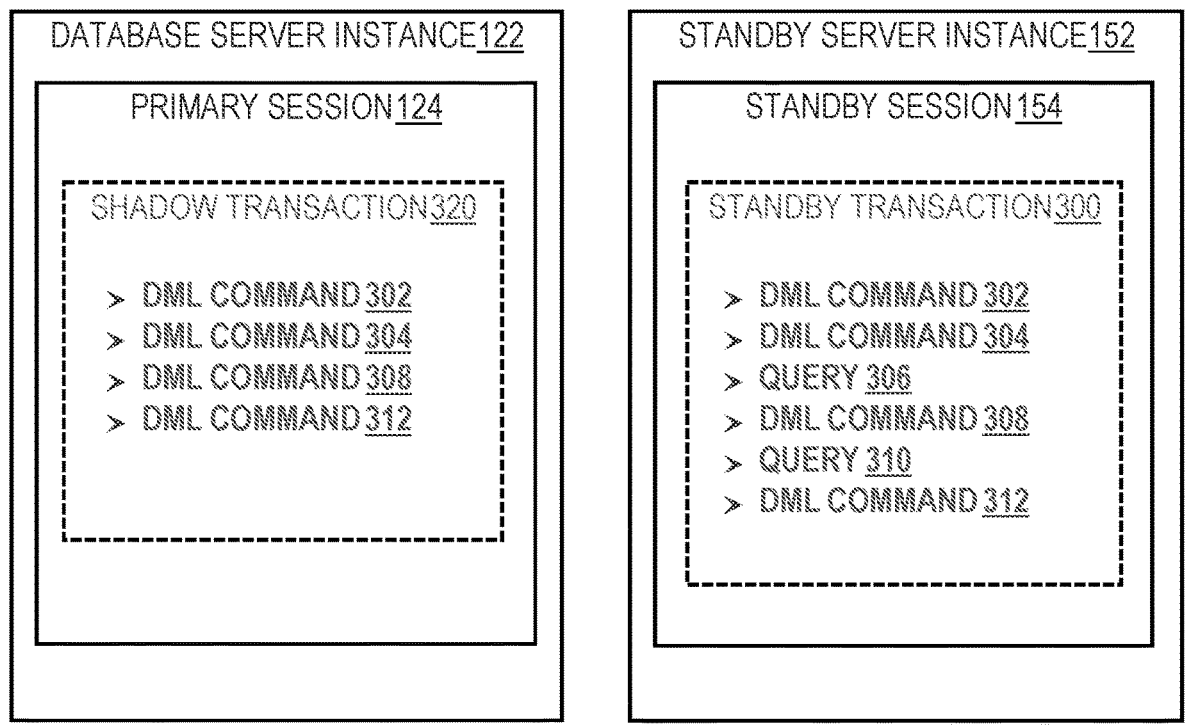
FIG. 3 depicts example primary and standby database server instance sessions executing transactions.

One or more of the functions attributed to any process described herein, may be performed any other logical entity that may or may not be depicted in FIG. 3, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer. Further, computing devices 120, 150, and 180 may variously be implemented by any type of computing device.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
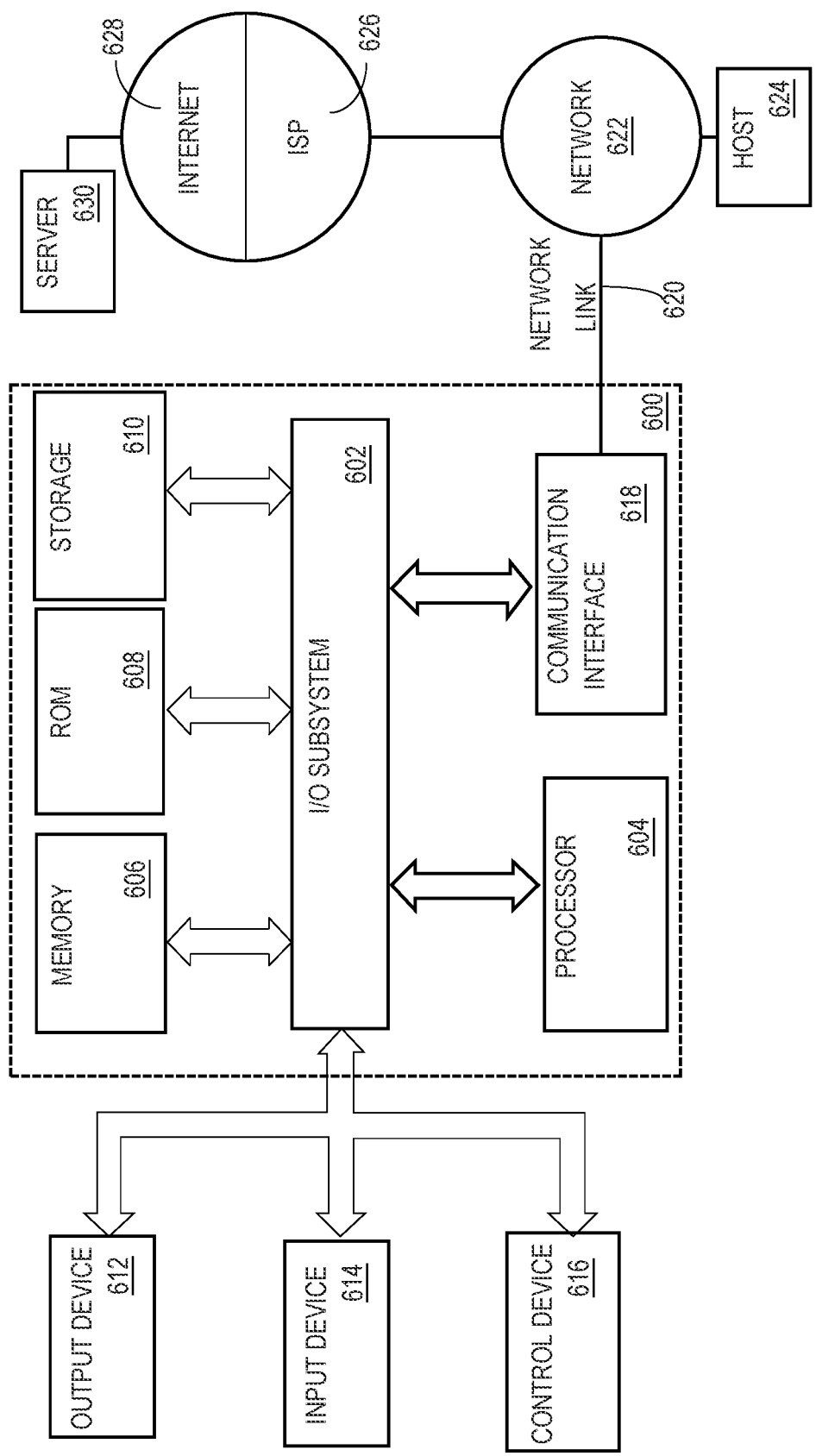
FIG. 6 is a block diagram that illustrates a computer system upon which various embodiments may be implemented.

For example, FIG. 6 is a block diagram that illustrates a computer system 600 upon which various embodiments of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic, or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

10. Software Overview

Figure 7:
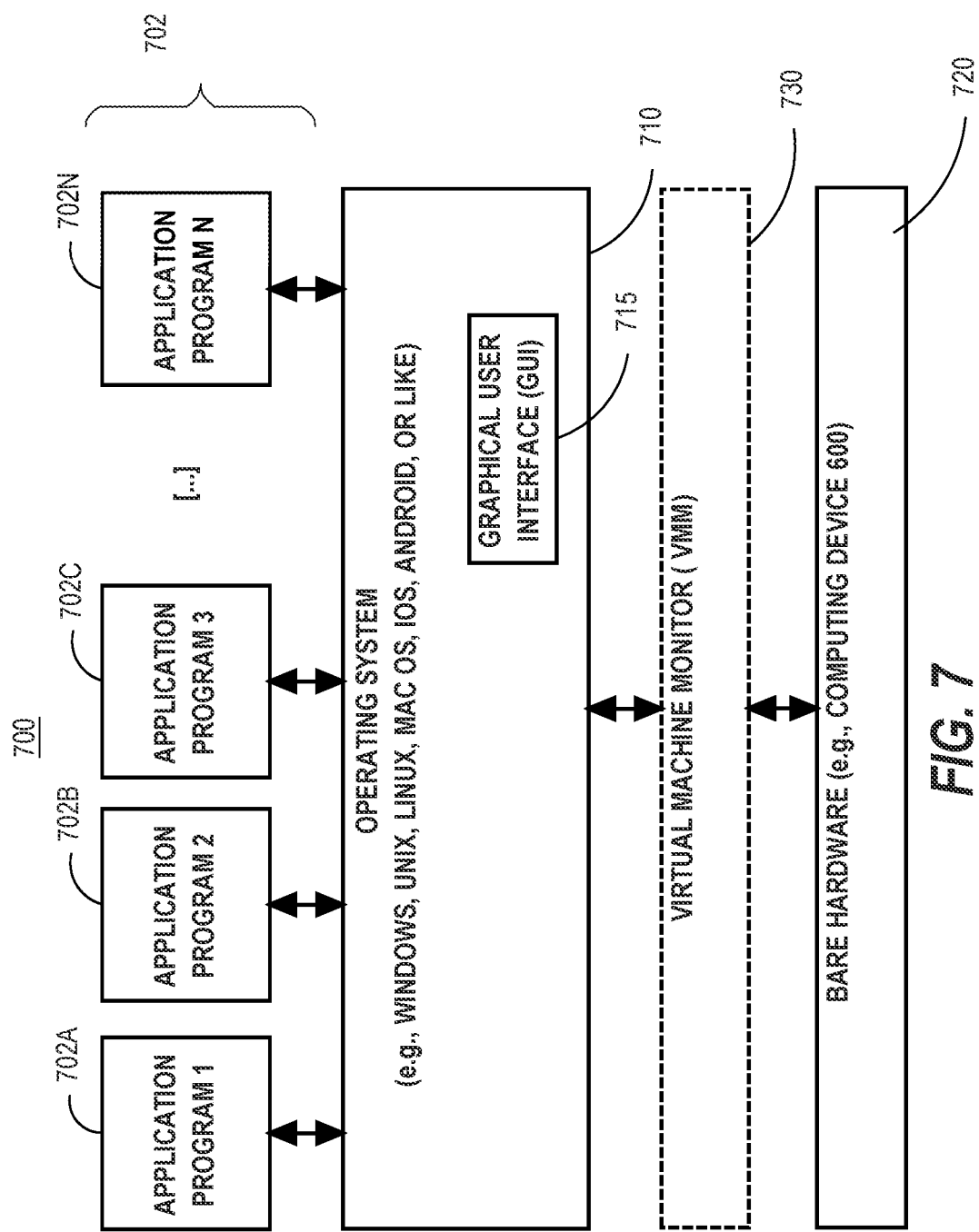
FIG. 7 is a block diagram of a basic software system that may be employed for controlling the operation of a computer system.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

11. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   maintaining, by a standby database system, a standby database that replicates a primary database maintained by a primary database system;
   the standby database system redirecting, to the primary database system, a Data Manipulation Language (DML) command from a particular standby session of the standby database system;
   wherein the DML command, when executed, causes modification of one or more database objects;
   receiving, from the primary database system, transaction metadata for a transaction that implemented the DML command within the primary database, the transaction metadata comprising one or more timestamps for the transaction;
   for each database object of the one or more database objects, recording, in session data for the particular standby session, a DML target object (DTO) record comprising a timestamp, of the one or more timestamps, and an identifier of said each database object;

after recording the one or more DTO records, executing a query in the particular standby session that accesses a particular database object, comprising:
  determining, by the standby database system, whether any valid DTO record in the session data includes an identifier of the particular database object,
  responsive to determining that a particular valid DTO record in the session data includes the identifier of the particular database object, delaying execution of the query at the standby database system; and
  responsive to determining that no valid DTO record in the session data includes the identifier of the particular database object, causing execution of the query at the standby database system without delaying;
wherein the method is performed by one or more computing devices.

2. The computer-implemented method of claim 1, wherein recording the one or more DTO records in the session data comprises recording the one or more DTO records in session-specific memory, of the standby database system, that is specific to the particular standby session.

3. The computer-implemented method of claim 1, wherein the particular valid DTO record is valid based on a synchronization timestamp, of the standby database, being earlier than a particular timestamp indicated in the particular valid DTO record.

4. The computer-implemented method of claim 1, wherein the one or more database objects modified by the DML command comprise the particular database object.

5. The computer-implemented method of claim 1, further comprising, after delaying execution of the query, using the particular standby session to execute the query over a copy of the particular database object in the standby database based, at least in part, on determining that a synchronization timestamp, for the standby database, has at least reached a particular timestamp indicated in the particular valid DTO record.

6. The computer-implemented method of claim 5, wherein:
  the one or more database objects modified by the DML, command comprise the particular database object;
  the transaction metadata further comprises primary transaction information for a primary transaction on the primary database system for the DML command;
  the method further comprises:
    associating the particular standby session with the primary transaction information for the primary transaction,
    wherein executing the query over the copy of the particular database object comprises retrieving uncommitted changes performed by the primary transaction using the primary transaction information associated with the particular standby session.

7. The computer-implemented method of claim 1, wherein:
  the query in the particular standby session that accesses the particular database object is a delay-requiring query;
  after recording the one or more DTO records and prior to executing the delay-requiring query, executing a particular query in the particular standby session that accesses a second database object, comprising:
    determining whether any valid DTO record in the session data includes an identifier of the second database object,
    responsive to determining that no valid DTO record in the session data includes the identifier of the second database object, executing the particular query over a copy of the second database object in the standby database.

8. The computer-implemented method of claim 7, further comprising:
  determining whether any valid DTO record in multi-session data maintained by the standby database system includes an identifier of the second database object,
  wherein said executing the particular query over the copy of the second database object in the standby database is performed in further response to determining that no valid DTO record in the multi-session data includes the identifier of the second database object.

9. The computer-implemented method of claim 8, further comprising, after the particular standby session completes execution of a transaction that includes the DML command adding one or more DTO records in the session data to the multi-session data.

10. The computer-implemented method of claim 1, wherein the standby database system redirecting, to the primary database system, the DML command is performed via a database link between the primary database system and the standby database system.

11. The computer-implemented method of claim 1, wherein each timestamp, of the one or more timestamps in the transaction metadata, is associated with an undo record that records a change effected by the DML command in the primary database.

12. One or more non-transitory computer-readable media storing one or more sequences of instructions that, when executed by one or more processors, cause:
  maintaining, by a standby database system, a standby database that replicates a primary database maintained by a primary database system;
  the standby database system redirecting, to the primary database system, a Data Manipulation Language (DML) command from a particular standby session of the standby database system;
  wherein the DML command, when executed, causes modification of one or more database objects;
  receiving, from the primary database system, transaction metadata for a transaction that implemented the DML command within the primary database, the transaction metadata comprising one or more timestamps for the transaction;
  for each database object of the one or more database objects, recording, in session data for the particular standby session, a DML target object (DTO) record comprising a timestamp, of the one or more timestamps, and an identifier of said each database object;
  after recording the one or more DTO records, executing a query in the particular standby session that accesses a particular database object, comprising:
    determining, by the standby database system, whether any valid DTO record in the session data includes an identifier of the particular database object,
    responsive to determining that a particular valid DTO record in the session data includes the identifier of the particular database object, delaying execution of the query at the standby database system, and
    responsive to determining that no valid DTO record in the session data includes the identifier of the particular database object, causing execution of the query at the standby database system without delaying.

13. The one or more non-transitory computer-readable media of claim 12, wherein recording the one or more DTO records in the session data comprises recording the one or more DTO records in session-specific memory, of the standby database system, that is specific to the particular standby session.

14. The one or more non-transitory computer-readable media of claim 12, wherein the particular valid DTO record is valid based on a synchronization timestamp, of the standby database, being earlier than a particular timestamp indicated in the particular valid DTO record.

15. The one or more non-transitory computer-readable media of claim 12, wherein the one or more database objects modified by the DML, command comprise the particular database object.

16. The one or more non-transitory computer-readable media of claim 12, wherein the one or more sequences of instructions further comprise instructions that, when executed by one or more processors, cause, after delaying execution of the query, using the particular standby session to execute the query over a copy of the particular database object in the standby database based, at least in part, on determining that a synchronization timestamp, for the standby database, has at least reached a particular timestamp indicated in the particular valid DTO record.

17. The one or more non-transitory computer-readable media of claim 16, wherein:
the one or more database objects modified by the DML, command comprise the particular database object;
the transaction metadata further comprises primary transaction information for a primary transaction on the primary database system for the DML command;
the one or more sequences of instructions further comprise instructions that, when executed by one or more processors, cause:
associating the particular standby session with the primary transaction information for the primary transaction,
wherein executing the query over the copy of the particular database object comprises retrieving uncommitted changes performed by the primary transaction using the primary transaction information associated with the particular standby session.

18. The one or more non-transitory computer-readable media of claim 12, wherein:
the query in the particular standby session that accesses the particular database object is a delay-requiring query;
the one or more sequences of instructions further comprise instructions that, when executed by one or more processors, cause:
after recording the one or more DTO records and prior to executing the delay-requiring query, executing a particular query in the particular standby session that accesses a second database object, comprising:
determining whether any valid DTO record in the session data includes an identifier of the second database object,
responsive to determining that no valid DTO record in the session data includes the identifier of the second database object, executing the particular query over a copy of the second database object in the standby database.

19. The one or more non-transitory computer-readable media of claim 18, wherein the one or more sequences of instructions further comprise instructions that, when executed by one or more processors, cause:
determining whether any valid DTO record in multi-session data maintained by the standby database system includes an identifier of the second database object,
wherein said executing the particular query over the copy of the second database object in the standby database is performed in further response to determining that no valid DTO record in the multi-session data includes the identifier of the second database object.

20. The one or more non-transitory computer-readable media of claim 19, wherein the one or more sequences of instructions further comprise instructions that, when executed by one or more processors, cause, after the particular standby session completes execution of a transaction that includes the DML command adding one or more DTO records in the session data to the multi-session data.

* * * * *

UNITED STATES PATENT AND TRADEMARK OFFICE
CERTIFICATE OF CORRECTION

| | | |
|---|---|---|
| PATENT NO. | : 12,050,620 B2 | Page 1 of 1 |
| APPLICATION NO. | : 17/524436 | |
| DATED | : July 30, 2024 | |
| INVENTOR(S) | : Sonawane et al. | |

It is certified that error appears in the above-identified patent and that said Letters Patent is hereby corrected as shown below:

In the Drawings

On sheet 2 of 8, in FIG. 2, under reference numeral 206, Line 2, delete "DM)" and insert -- DML --, therefor.

In the Claims

In Column 21, Line 42, in Claim 6, delete "DML," and insert -- DML --, therefor.

In Column 23, Line 15, in Claim 15, delete "DML," and insert -- DML --, therefor.

In Column 23, Line 29, in Claim 17, delete "DML," and insert -- DML --, therefor.

Signed and Sealed this
Seventeenth Day of December, 2024

Derrick Brent
*Acting Director of the United States Patent and Trademark Office*